United States Patent
Rocklitz et al.

(10) Patent No.: US 6,451,080 B1
(45) Date of Patent: Sep. 17, 2002

(54) AIR CLEANER

(75) Inventors: Gary J. Rocklitz, Burnsville; Junhui Liu, St. Paul; Donald Monson, West St. Paul; Steven S. Gieseke, Richfield; Peter J. Murray, Bloomington, all of MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/612,664

(22) Filed: Jul. 10, 2000

(51) Int. Cl.[7] .............................................. B01D 45/14
(52) U.S. Cl. .......................................... 55/404; 55/406
(58) Field of Search ......................... 55/404, 406, 401, 55/457, DIG. 14, 385.3, 394, 396, 397, 400, 416, 443

(56) References Cited

U.S. PATENT DOCUMENTS

| | | |
|---|---|---|
| 297,028 A | 4/1884 | Stainfield |
| 653,518 A | 7/1900 | Martin |
| 710,626 A | 10/1902 | Smith |
| 970,397 A | 9/1910 | Rush |
| 1,319,059 A | 10/1919 | Funk |
| 1,434,562 A | 11/1922 | Quam |
| 1,438,553 A | 12/1922 | Quam |
| 1,525,136 A | 2/1925 | Kopke |
| 1,530,825 A | 3/1925 | Grimes |
| 1,537,690 A | 5/1925 | Portham et al. |
| 1,641,746 A | 9/1927 | Donaldson |
| 1,734,030 A | 11/1929 | Bennett |
| 1,864,201 A | 6/1932 | Kegerreis et al. |
| 1,870,216 A | 8/1932 | Baldwin |
| 1,871,337 A | 8/1932 | Moulding |
| 1,871,384 A | 8/1932 | Miller |
| 1,934,311 A | 11/1933 | Kegerreis et al. |
| 2,193,479 A | 3/1940 | Donaldson |
| 2,304,778 A | 12/1942 | Cresswell |
| 2,374,238 A | 4/1945 | Schneible et al. |

(List continued on next page.)

FOREIGN PATENT DOCUMENTS

| | | |
|---|---|---|
| FR | 683986 | 6/1930 |
| IT | 483058 | 7/1953 |

OTHER PUBLICATIONS

"How Turbo II Pre–cleaners Work" (Mar. 1993).

Primary Examiner—Duane S. Smith
(74) Attorney, Agent, or Firm—Merchant & Gould P.C.

(57) ABSTRACT

The present disclosure relates to an air cleaner for moving particles from an air stream. The air cleaner includes a housing defining a separation chamber at which at least some of the particles are removed from the air stream. The air cleaner includes an inlet passage for allowing the air stream to the separation chamber, an outlet passage for allowing the air stream to exit the separation chamber, and a plurality of vanes for causing the air stream to swirl as the air stream flows through the inlet passage and enters the separation chamber. The housing includes a side wall structure defining at least one discharge opening through which particles are discharged as the air stream swirls within the separation chamber.

38 Claims, 13 Drawing Sheets

U.S. PATENT DOCUMENTS

| | | |
|---|---|---|
| 2,417,130 A | 3/1947 | Russell |
| 2,905,266 A | 9/1959 | Poch |
| 2,973,830 A | 3/1961 | Gruner |
| 2,973,836 A | 3/1961 | Klaue |
| 3,339,533 A | 9/1967 | Nordstrom |
| 3,552,102 A | 1/1971 | Araki |
| 3,670,480 A | 6/1972 | Petersen |
| 3,740,932 A | 6/1973 | Borsheim |
| 3,898,066 A | 8/1975 | Miskiewicz |
| 3,907,529 A | 9/1975 | Borsheim |
| 3,973,937 A | 8/1976 | Petersen |
| 4,013,137 A | 3/1977 | Petersen |
| 4,014,673 A | 3/1977 | Kinnison |
| 4,038,058 A | 7/1977 | Miskiewicz |
| 4,048,911 A | 9/1977 | Petersen |
| 4,080,184 A | 3/1978 | Petersen |
| 4,097,256 A | 6/1978 | Borsheim |
| 4,135,879 A | 1/1979 | Gondek |
| 4,138,761 A | 2/1979 | Nauta |
| 4,156,449 A | 5/1979 | Petersen |
| 4,173,458 A | 11/1979 | Stiles |
| 4,197,102 A | 4/1980 | Decker |
| 4,201,557 A | 5/1980 | Petersen |
| 4,373,940 A | 2/1983 | Petersen |
| 4,382,804 A | 5/1983 | Mellor |
| D273,956 S | 5/1984 | Petersen |
| 4,459,141 A | 7/1984 | Burrington et al. |
| 4,547,207 A | 10/1985 | Petersen |
| RE33,085 E | 10/1989 | Petersen |
| 5,022,903 A | 6/1991 | Decker |
| 5,059,222 A | 10/1991 | Smith |
| 5,240,593 A | 8/1993 | Moredock |
| 5,449,391 A | 9/1995 | Decker |
| 5,505,756 A | 4/1996 | Decker |
| 5,656,050 A | 8/1997 | Moredock |
| 5,766,315 A | 6/1998 | Moredock |
| 5,891,207 A | 4/1999 | Katta |
| 6,110,246 A * | 8/2000 | Eubank |
| 6,280,493 B1 * | 8/2001 | Eubank |

* cited by examiner

AIR CLEANER

FIELD OF THE INVENTION

The present invention relates generally to air cleaners. More particularly, the present invention relates to inertial separation devices for removing particles or droplets from a fluid stream.

BACKGROUND OF THE INVENTION

Air pre-cleaners are commonly used to remove contaminants (e.g., dust or other particulate matter) from the intake streams of internal combustion engines. U.S. Pat. No. 1,641,746 discloses an air cleaner that uses an inertial separation process to remove particles from an air stream. The cleaner disclosed in the '746 patent includes a housing 7 having an annular intake passage 14 and an outlet tube 10. A plurality of oblique vanes 12 are positioned within the intake passage 14. The vanes 12 cause the intake air passing through the intake passage 14 to swirl in a spiral motion as the intake air enters the housing 7. The swirling action of the intake air causes particulate matter within the air to be centrifugally thrown against the side wall of the housing 7 and collected in a dust chamber 15. Clean air exits the housing 7 through the outlet tube 10.

U.S. Pat. No. 3,973,937 discloses another type of inertial air cleaner for removing particulate matter from the intake air stream of an internal combustion engine. The '937 patent discloses an air pre-cleaner having a housing 113 including an annular air inlet passageway 122 and a tubular outlet passage 119. A plurality of swirling vanes 126 are positioned within the inlet passageway 122, and spinner assembly 133 is located within the housing 113. In use, air flows through the air inlet passage 122 and is caused to swirl within the housing 113. Particulate material within the swirling air stream is centrifugally thrown against a side wall of the housing 113 and discharged to atmosphere through a discharge opening formed in the side wall of the housing 113. The spinner assembly 133 assists in sweeping particles out of the discharge opening. Clean air exits the housing 113 through the outlet passage 119.

In designing an inertial air cleaner, it is desirable to provide a device having a high particulate removal efficiency and a relatively low pressure drop.

SUMMARY OF THE INVENTION

One aspect of the present invention relates to an air cleaner for removing particles from an air stream. The air cleaner includes a housing defining a separation chamber at which at least some of the particles are removed from the air stream. The housing includes an inlet passage for allowing the air stream to enter the separation chamber, and an outlet passage for allowing the air stream to exit the separation chamber. The outlet passage includes an air entrance end positioned opposite from an air exit end. The air entrance end of the outlet passage is positioned to receive the air stream from the separation chamber. Adjacent its air entrance end, the outlet passage has a cross-sectional passage area $A_1$. The inlet passage also includes an air entrance end positioned opposite from an air exit end. The air exit end of the inlet passage has a cross-sectional passage area $A_2$. The cross-sectional passage areas $A_1$ and $A_2$ are relatively sized such that $A_1/A_2$ is in the range of 0.7–1.9. The air cleaner further includes a plurality of vanes for causing the air stream to swirl as the air stream flows through the inlet passage and enters the separation chamber. A spinner assembly is positioned within the separation chamber for transferring rotational energy from a mid-region of the separation chamber to an outer region of the separation chamber.

Another aspect of the present invention relates to an air cleaner including a housing defining a separation chamber at which at least some of the particles are removed from the air stream. The air cleaner also includes an inlet passage for allowing the air stream to enter the separation chamber, and an outlet tube defining an outlet passage for allowing the air stream to exit the separation chamber. The outlet tube includes: (a) an air entrance end positioned opposite from an air exit end; and (b) a tapered portion positioned adjacent the air entrance end of the outlet tube. The tapered portion of the outlet tube tapers radially outward such that a cross-sectional passage area of the outlet tube increases as the outlet tube extends in a direction toward the air entrance end of the outlet tube. The tapered portion is aligned along an angle $\theta$ in the range of 15–45 degrees relative to a central axis of the outlet tube. The inlet passage of the air cleaner is at least partially defined by an outer surface of the outlet tube. The inlet passage includes: (a) an air entrance end positioned opposite from an air exit end; and (b) a transition region provided by the tapered portion of the outlet tube that reduces a cross-sectional passage area of the inlet passage as the inlet passage extends toward the air exit end of the inlet passage. The air cleaner further includes a plurality of vanes for causing the air stream to swirl as the air stream flows through the inlet passage and enters the separation chamber. A spinner assembly is positioned within the separation chamber for transferring rotational energy from a mid-region of the separation chamber to an outer region of the separation chamber.

Still another aspect of the present invention relates to an air cleaner for removing particles from an air stream. The air cleaner includes a housing defining a separation chamber at which at least some of the particles are removed from the air stream. The housing includes a side wall structure surrounding a central axis of the housing. The air cleaner also includes an annular inlet passage for allowing the air stream to enter the separation chamber, an outlet passage for allowing the air stream to exit the separation chamber, and a plurality of vanes for causing the air stream to swirl as the air stream flows through the inlet passage and enters the separation chamber. The annular inlet passage is defined by inner and outer walls. The inner wall includes a transition region that reduces a cross-sectional passage area of the inlet passage as the inlet passage extends toward an air exit end of the inlet passage. The transition region is configured such that no portion of the transition region is aligned at an angle outside a range of 15–45 degrees relative to a central axis of the housing. A spinner assembly is positioned within the separation chamber for transferring rotational energy from a mid-region of the separation chamber to an outer region of the separation chamber.

A variety of advantages of the invention will be set forth in part in the description that follows, and in part will be apparent from the description, or may be learned by practicing the invention. It is to be understood that both the foregoing general description and the following detailed description are illustrative and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION

Reference will now be made in detail to various aspects of the present invention that are illustrated in the accompanying drawings. Wherever possible, the same reference numbers will be used throughout the drawings to refer to the same or like parts.

Figure 1:
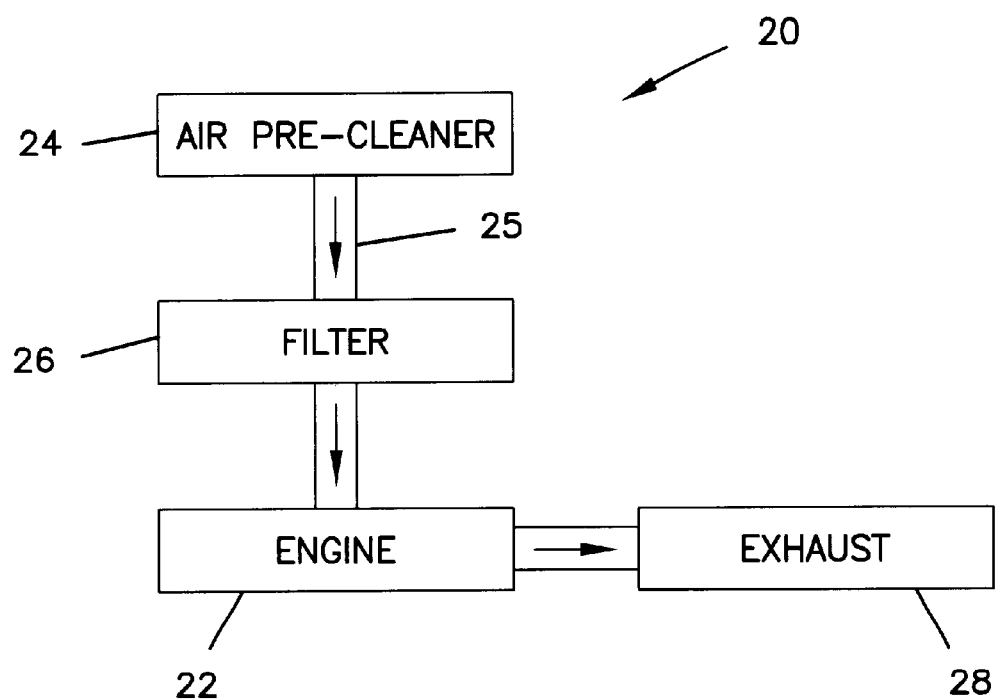
FIG. 1 is a block diagram illustrating one type of system in which an air cleaner in accordance with the principles of the present invention could be used.

The present invention relates generally to air cleaners. Air cleaners are frequently used to remove particulate material from the air intake system of an internal combustion engine. FIG. 1 illustrates an exemplary air intake system 20. The air intake system 20 provides a passage or conduit for directing intake air to an engine 22 (e.g., an internal combustion engine). Air drawn into the intake system 20 is initially cleaned at an air pre-cleaner 24. After exiting the pre-cleaner 24, the air is drawn through a secondary filter 26. Thereafter, the intake air flows to the engine 22 and is exhausted through an exhaust system 28.

It will be appreciated that the air pre-cleaner 24 can be used in association with the intake systems of a variety of different types of internal combustion engines 22. A preferred environment relates to engines for use with motorized vehicles. For example, the air pre-cleaner 24 can be used on the intake systems of vehicles such as agricultural equipment (e.g., tractors, combines, harvesters, etc.), heavy construction equipment (e.g., graders, front end loaders, back hoes, etc.), snow removal equipment, lawn and garden tractors, and street sweepers. For such uses, it is common for the air pre-cleaner 24 to be mounted on an upright stack 25 (shown schematically in FIG. 1) of the air intake system 20. However, it will be appreciated that the air pre-cleaner 24 can be mounted at any orientation (e.g., the cleaner 24 can be mounted on a horizontal intake pipe or an inclined intake pipe). Furthermore, the air pre-cleaner 24 can also be used in other applications. For example, the air pre-cleaner 24 can be used to clean the intake air of other types of devices such as stationary engines, etc.

Figure 2A:
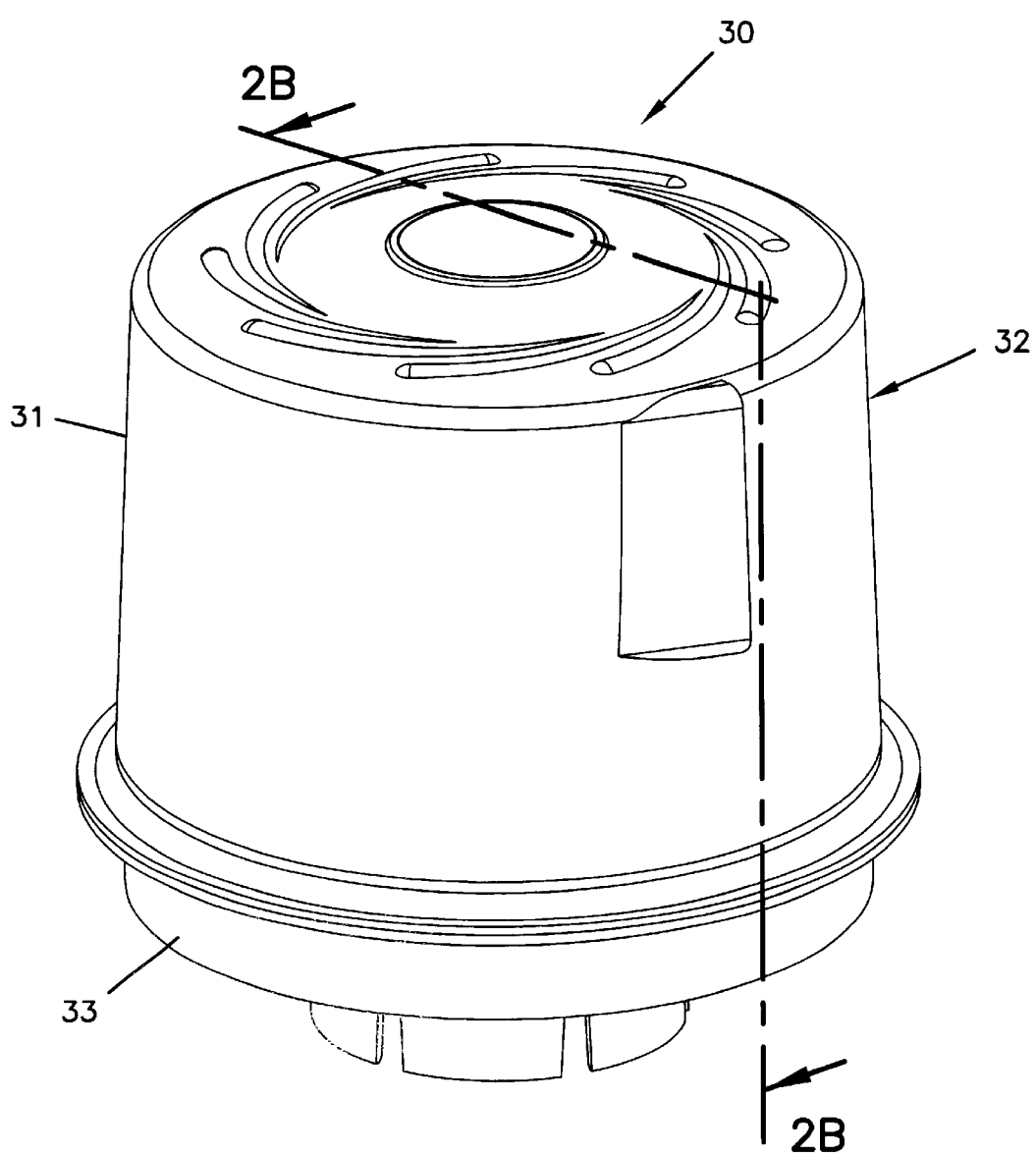
FIG. 2A is a perspective view of an air cleaner constructed in accordance with the principles of the present invention.

FIG. 2A illustrates an air cleaner 30 constructed in accordance with the principles of the present invention. It will be appreciated that the air cleaner 30 can be used as the air pre-cleaner 24 of the air intake system 20 shown in FIG. 1. It will also be appreciated that the air cleaner 30 can also be used for any type of application where material (e.g., dust, dirt, droplets, etc.) is desired to be removed from an air stream.

Figure 2B:
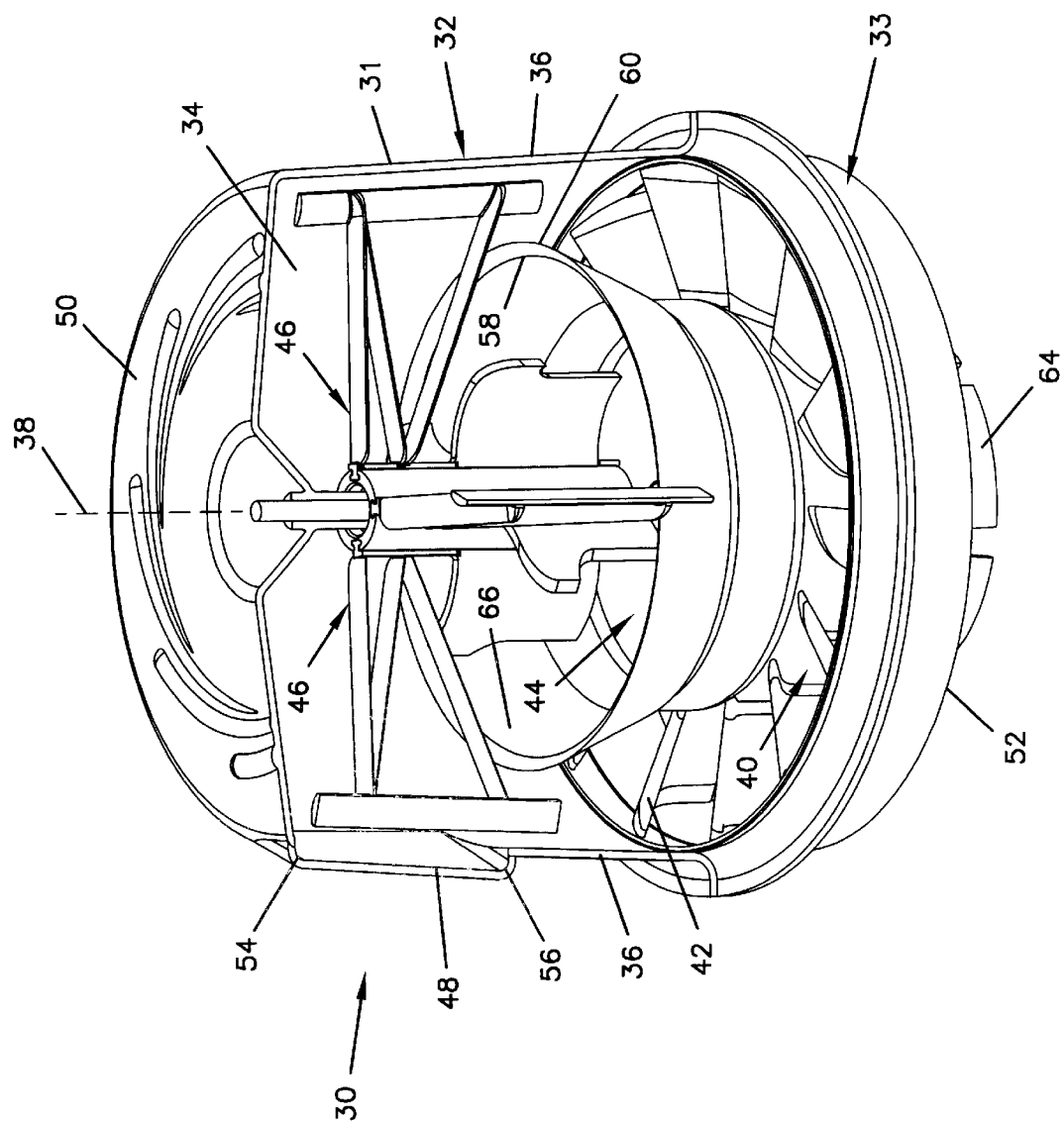
FIG. 2B shows the air cleaner of FIG. 2A with the upper housing partially cut along section line 2B—2B to reveal the interior of the air cleaner.
Figure 3:
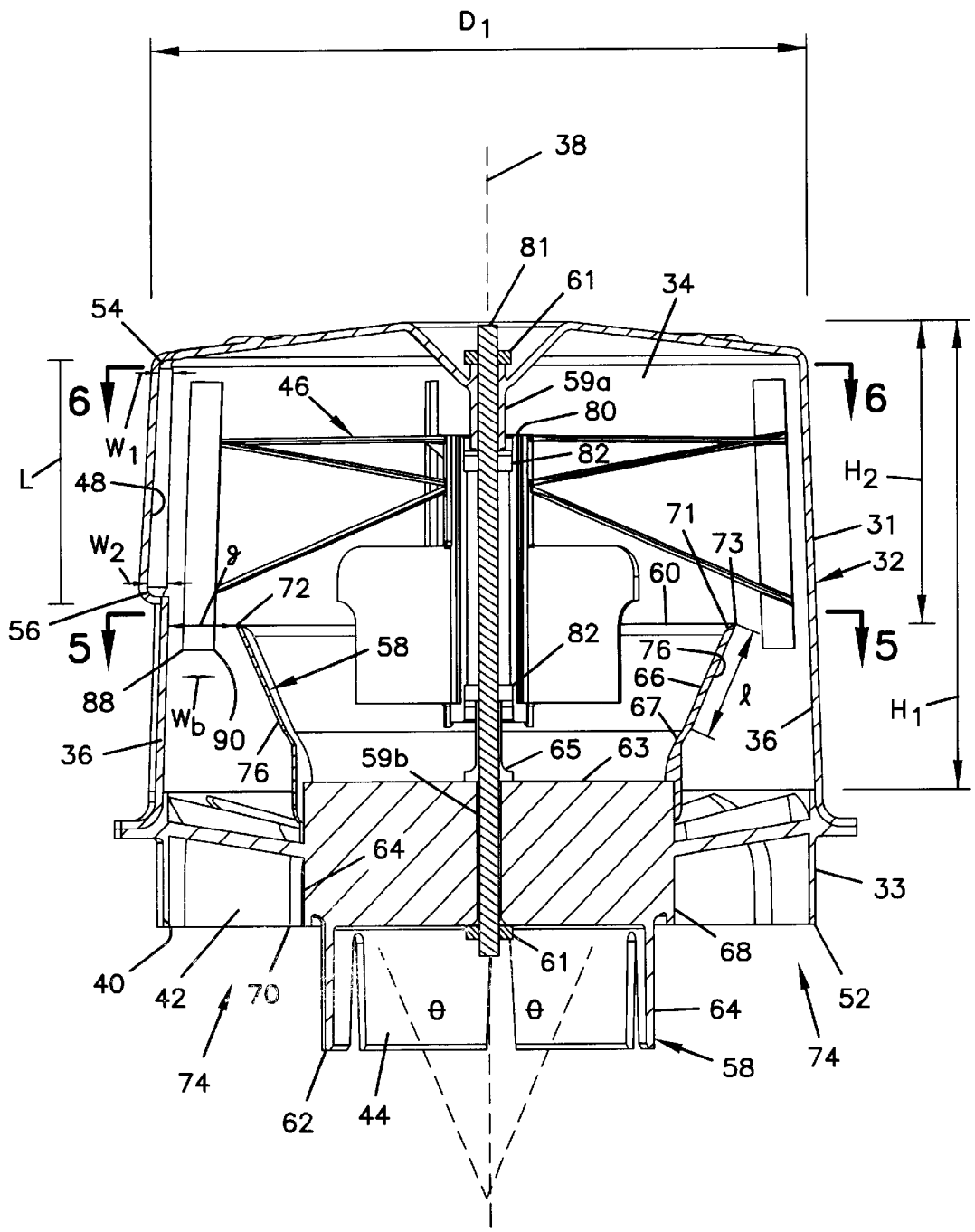
FIG. 3 is a cross-sectional view of FIG. 4 taken along section line 3—3.

Referring to FIGS. 2B and 3, the air cleaner 30 includes a housing 32 having a top piece 31 and a base 33. The top piece 31 includes a side wall structure 36 that surrounds a central, longitudinal axis 38 of the housing 32 and at least partially defines a separation chamber 34 of the housing. An inlet passage 40 is provided for allowing an air stream to enter the separation chamber 34, and an outlet passage 44 is provided for allowing the air stream to exit the separation chamber 34. A plurality of vanes 42 are positioned within the inlet passage 40 for causing the air stream to swirl (e.g., rotate or otherwise move in a helical or spiral pattern) as the air stream flows through the inlet passage 40 and enters the separation chamber 34. A spinner assembly 46 is positioned in the separation chamber 34 for increasing the rotational velocity of the air stream adjacent to the side wall structure 36 of the housing 32. An elongated discharge opening or slot 48 is defined through the side wall structure 36 for allowing particles within the air stream to be discharged from the separation chamber 34 to atmosphere.

In use, the air stream enters the separation chamber 34 through the inlet passage 40. As the air stream flows through the inlet passage 40, the vanes 42 cause the air stream to swirl within the separation chamber 34. The swirling action of the air stream causes particulate matter within the air stream to be thrown radially outward by centrifugal force against the side wall structure 36 of the housing 32. As the particles are forced radially outward by centrifugal force, at least some of the particles are discharged from the separation chamber 34 through the discharge opening 48. The spinner assembly 46 assists in sweeping the particles out the discharge opening 48. Additionally, the spinner assembly 46 transfers rotational energy from the middle of the separation chamber 34 to a region adjacent to the side wall structure 36 of the housing 32.

Referring still to FIGS. 2B and 3, the housing 32 of the air cleaner 30 has a generally cylindrical configuration with a closed end 50 positioned opposite from an at least partially open end 52 (hereinafter referred to as the "open end 52"). The closed end 50 is formed by the top piece 31 of the housing 32, and the open end 52 is formed by the base 33. For strength, the closed end 50 is preferably slightly curved, but could also be flat. The side wall structure 36 of the housing 32 extends between the closed and open ends 50 and 52 to define the separation chamber 34. The side wall structure 36 also defines the discharge opening 48 of the air cleaner 30. The discharge opening 48 has a length L that extends in a direction generally between the closed end 50 and the open end 52 of the housing 32. A first end 54 of the discharge opening 48 is located adjacent to the closed end 50 of the housing 32, and a second end 56 of the discharge opening is located adjacent to the inlet passage 40. Preferably, the first end of the discharge opening 48 has a radial passage width $W_1$ that is smaller than a radial passage width $W_2$ of the second end 56 of the discharge opening 48. In the preferred embodiment, the width of the discharge opening 48 gradually tapers between the width $W_1$ and the width $W_2$. However, in alternative embodiments, discontinuous variations in width could be utilized.

Due to their larger mass, larger particles in the air stream entering the separation chamber 34 will initially be thrown against the side wall structure 36 at a region immediately above the inlet passage 40. Therefore, it is desirable for the larger radial width $W_2$ of the discharge opening 48 to be located near the inlet passage 40 to accommodate these larger particles. Smaller particles will have a tendency to migrate farther up into the separation chamber 34 before being discharged through the discharge opening 48. Consequently, the discharge opening 48 can be narrower adjacent the first end 54. By narrowing the discharge opening 48 adjacent the first end 54, the total cross-sectional passage area of the discharge opening 48 can be reduced while still allowing larger particles to be discharged from the separation chamber 34. The reduction in cross-sectional area of the discharge opening 48 can be advantageous because such a reduction reduces the amount of contaminants that enter the separation chamber 34 through the discharge opening 48 when the air cleaner 30 is not in use.

Referring to FIG. 3, the outlet passage 44 of the air cleaner 30 is defined by an outlet tube 58 positioned at the open end 52 of the housing 32. The outlet tube 58 includes an air entrance end 60 positioned opposite from an air exit end 62. The air entrance end 60 is located within the top piece 31 of the housing 32 and is positioned to receive clean air flowing from the separation chamber 34. The air exit end 62 located adjacent the base piece 33 of the housing and is adapted to discharge the clean air from the housing 32. The outlet tube 58 includes a constant diameter portion 64 positioned adjacent the air exit end 62, and a tapered portion 66 positioned at the air entrance end 60. The tapered portion 66 tapers radially outward such that a cross-sectional passage area of the outlet tube 58 increases as the outlet tube 58 extends in a direction toward the air entrance end 60. As shown in FIG. 3, the constant diameter portion 64 comprises a cylinder, and the tapered portion 66 comprises a truncated cone. The truncated cone has a major diameter at the air entrance end 60 and a minor diameter at an interface 67 between the constant diameter portion 64 and the tapered portion 66. The truncated cone preferably has a cone angle θ in the range of 15–45 degrees relative to the central longitudinal axis 38 of the housing 32. More preferably, the cone angle θ is in the range of 20–30 degrees. Most preferably, the cone angle is about 25 degrees.

Preferably, the interface 67 between the constant diameter portion 64 and the tapered portion 66 is located slightly above the vanes 42 in the inlet passage 40. As shown in FIG. 3, the interface 67 defines an inner curved surface that provides a smooth transition between the tapered portion 66 and the constant diameter portion 64 of the outlet tube 58.

Referring still to FIG. 3, the inlet passage 40 of the air cleaner 30 is generally annular and concentrically surrounds the outlet tube 58. For example, the inlet passage 40 is shown defined between an outer surface 68 of the outlet tube 58 and the side wall structure 36 of the housing 32. The inlet passage 40 includes an air entrance end 70 positioned opposite from an air exit end 72. The air entrance end 70 is located adjacent the open end 52 of the housing 32, and the air exit end 72 is located adjacent to the separation chamber 34. During normal use, air enters the inlet passage 40 at the air entrance end 70 and exits the inlet passage 40 (i.e., flows from the inlet passage 40 to the separation chamber 34) at the air exit end 72.

The inlet passage 40 includes a transition surface or region 76 provided by the outer surface of the tapered portion 66 of the outlet tube 58. The transition region 76 reduces a cross-sectional passage area of the inlet passage 40 as the inlet passage 40 extends toward the air exit end 72 of the inlet passage 40. Because the transition region 76 is formed by the tapered portion 66 of the outlet tube 58, the transition region 76 preferably aligns along the angle θ defined by the tapered portion 66. Similar to the tapered portion 66, the transition region 76 preferably has a truncated conical configuration.

Figure 4:
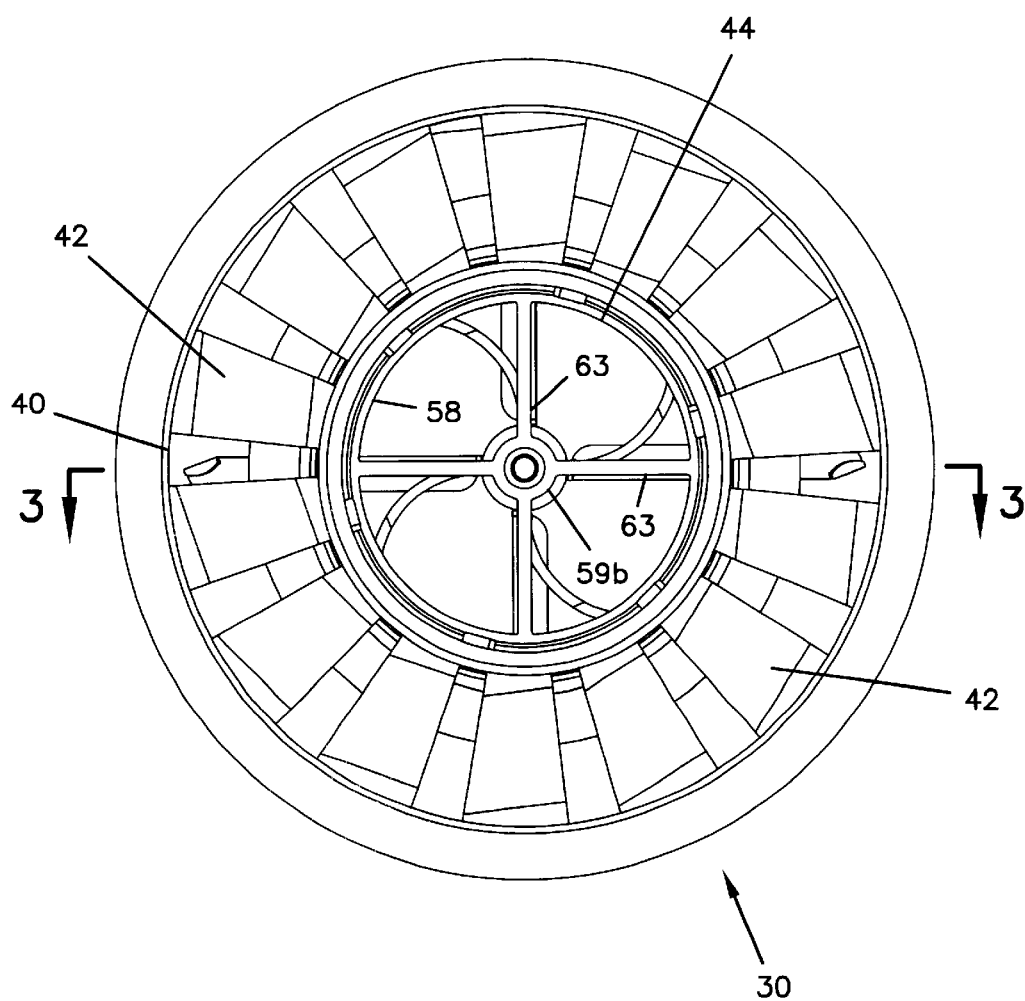
FIG. 4 is a bottom plan view of the air cleaner of FIG. 2.

As best shown in FIGS. 1, 2B and 4, the vanes 42 of the air cleaner 30 are located adjacent the air entrance end 70 of the inlet passage 40. Preferably, the vanes 42 are fixed between the side wall structure 36 of the housing 32 and the outer surface 68 of the outlet tube 58. Each of the vanes 42 is curved and preferably has a component aligned at an oblique angle relative to a direction of axial flow (indicated by arrow 74) through the inlet passage 40. As is known in the art, such a configuration causes the air stream to swirl as it passes through the vanes 42. This swirling action continues as the air stream flows upward through the inlet passage 40 to the separation chamber 34.

The turning angle of the vanes 42 is preferably in the range of 60–70 degrees. However, it will be appreciated that any known configuration for imparting swirling energy to an air stream could be used.

In designing an air cleaner, it is desirable to maximize the particle removal efficiency while minimizing pressure loss. In one embodiment, the air cleaner has a particle removal efficiency greater than or equal to 81% and a pressure drop less than or equal to 3.6 inches of water. This particle removal efficiency is determined for an air flow through the air cleaner of 385 cubic feet per minute, using ISO (International Organization for Standardization) course A.T.D. 12103-1, A4 dust. Testing protocol is in accordance with SAE (Society of Automotive Engineers) Standard J726 or ISO Standard 5011.

To improve the removal efficiency, it is desirable to reduce the amount of air that bypasses the separation chamber 34 by flowing directly from the air exit end 72 of the inlet passage 40 to the air entrance end 60 of the outlet tube 58. One technique for decreasing the portion of flow that bypasses the separation chamber 34 is to increase the relative height of the separation chamber 34. By increasing the height of the separation chamber 34, the particle dwell time in the separation chamber 34 is increased, and the portion of flow that turns sharply from the inlet 40 to the outlet 44 is decreased. It has been determined that a preferred height $H_1$ to diameter $D_1$ ratio ($H_1/D_1$) is in the range of 0.5–1. As shown in FIG. 3, $H_1$ is measured from the tops of the vanes 42 to the closed end 50 of the housing 32, and the diameter $D_1$ is the inner diameter of the separation chamber 34 at the air exit end 72 of the inlet 40. As shown in FIG. 3, the diameter $D_1$ is also the maximum diameter of the separation chamber 34. It has also been determined that a preferred height $H_2$ to diameter $D_1$ ratio ($H_2/D_1$) is in the range of 0.3–0.75. As shown in FIG. 3, $H_2$ is measured from the air entrance end 60 of the outlet tube 58 to the closed end 50 of the housing 32.

Figure 5:
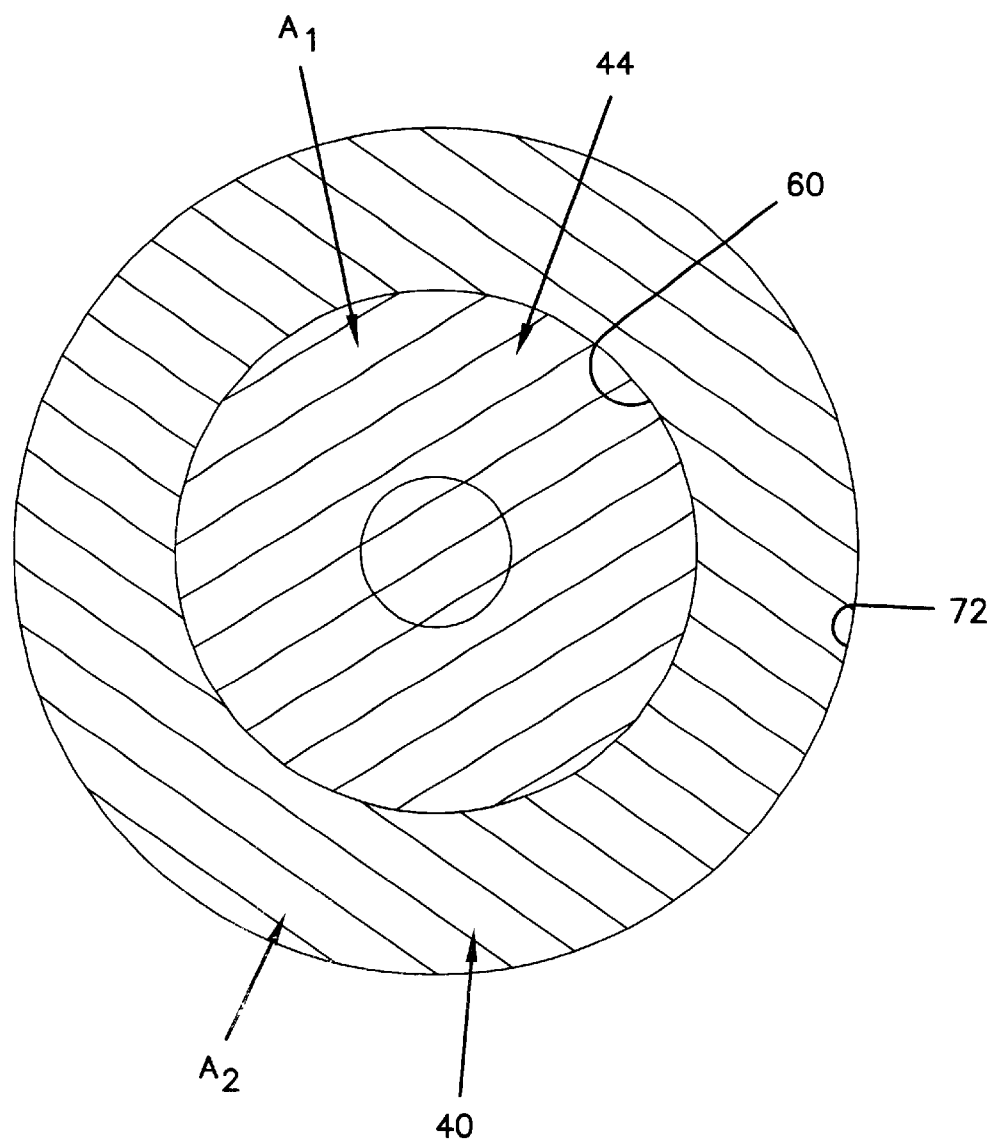
FIG. 5 is a cross-sectional view taken along section line 5—5 of FIG. 3.

In addition to increasing the height of the separation chamber 34, the percentage of the air stream that bypasses the separation chamber 34 can also be reduced by increasing the passage area at the air entrance end 60 of the outlet tube 58. As shown in the embodiment of FIG. 3, the tapered portion 66 of the outlet tube 58 functions to increase the passage area of the outlet tube 58 and decrease the passage area of the inlet passage 40. For example, as shown in FIG. 5, the outlet tube 58 has a passage area $A_1$ at its air entrance end 60, and the inlet passage 40 has a passage area $A_2$ at its air exit end 72. By increasing the passage area $A_1$, the axial velocity at the outlet tube 58 is reduced thereby reducing the local pressure loss at the outlet tube 58. By reducing the passage area $A_2$, the axial velocity at the air exit end 72 of the inlet passage 40 is increased thereby increasing the local pressure loss when the air stream exits the inlet passage 40. By balancing the passage areas $A_1$ and $A_2$, the reduction of pressure loss caused by the increase of the passage area $A_1$ will be greater than the increase of pressure loss caused by the decrease of the inlet passage area $A_2$. To achieve this balance, it is desirable to have the passage area $A_2$ of the inlet passage 40 slightly smaller than the passage area $A_1$ of the outlet tube 58. A preferred or optimized ratio $A_1/A_2$ is in the range of 0.7–1.9. A more preferred range is in the range of 1.2–1.4. A most preferred ratio is about 1.3.

As indicated above, by reducing the passage area $A_2$, the axial velocity at the air exit end 72 of the inlet passage 40 is increased. This increase in axial velocity at the air exit end 72 of the inlet passage 40 assists in reducing the number of particles that bypass the separation chamber 34 because particles within the air stream are given more momentum to spiral upward. The increased momentum inhibits the particles from immediately turning back into the outlet tube 58. Additionally, the angled transition region 76 located at the air exit end 72 of the inlet 40 directs the air stream slightly toward the side wall structure 36 rather than toward the chamber center. Thus, the particles are directed away from the outlet tube 58.

Preferably, the transition region 76 is sufficiently long to stabilize air flow into the separation chamber 34 in a direction generally parallel to the transition region 76 surface (i.e., in a direction along the angle θ). To stabilize flow, the transition region 76 preferably has a length l (shown in FIG. 3) that is longer than the distance defined by a gap g (shown in FIG. 3) located at the air exit end 72 of the inlet 40. As previously indicated, it is preferred for the transition region 76 to taper at the angle θ in the range of 15–45 degrees relative to the central longitudinal axis 38.

As shown in FIG. 3, the transition region 76 has a taper with a constant taper angle θ along the entire length l. However, in alternative embodiments, the transition region 76 can have portions aligned at different angles relative to the longitudinal axis. For example, the transition region 76 can include curved portions or multiple discrete portions aligned at oblique angles relative to one another. Preferably, along the entire length l, no portion of the transition region 76 is angled outside the range of 15–45 degrees relative to the central longitudinal axis 38.

To further prevent particles from by-passing the separation chamber 34, it is preferred for an outer lip 73 of the outlet tube 58 to have a relatively sharp edge. The sharp edge is formed at an intersection between the transition region/surface 76 and a curved top surface 71 located at the mouth of the outlet tube 58. The sharp edge assists in enhancing particle separation at the region where the particle laden flow has a tendency to turn and enter the outlet tube 58.

Referring still to FIGS. 2B and 3, the spinner assembly 46 of the air cleaner 30 includes a central hub 80 that is mounted on a central shaft 81. A plurality of bearings 82 allow the hub 80 to freely rotate relative to the shaft 81. The shaft 81 is supported within the housing by a top sleeve 59a and a bottom sleeve 59b. The top is sleeve 59a is integrally formed with the top piece 31 of the housing 32, and the bottom sleeve 59b is connected to the outlet tube 58 by a plurality of radial legs 63 (e.g., four legs are shown in FIG. 4). A spacer 65 spaces the lowermost bearing 82 from the bottom sleeve 59b. The shaft 81 can be used to clamp the top piece 31 of the housing 32 to the base piece 33. For example, nuts 61 can be threaded on the top and bottom ends of the shaft to clamp the housing 32 together. In such an embodiment, the nuts abut against the top and bottom sleeves 59a and 59b.

Figure 7:
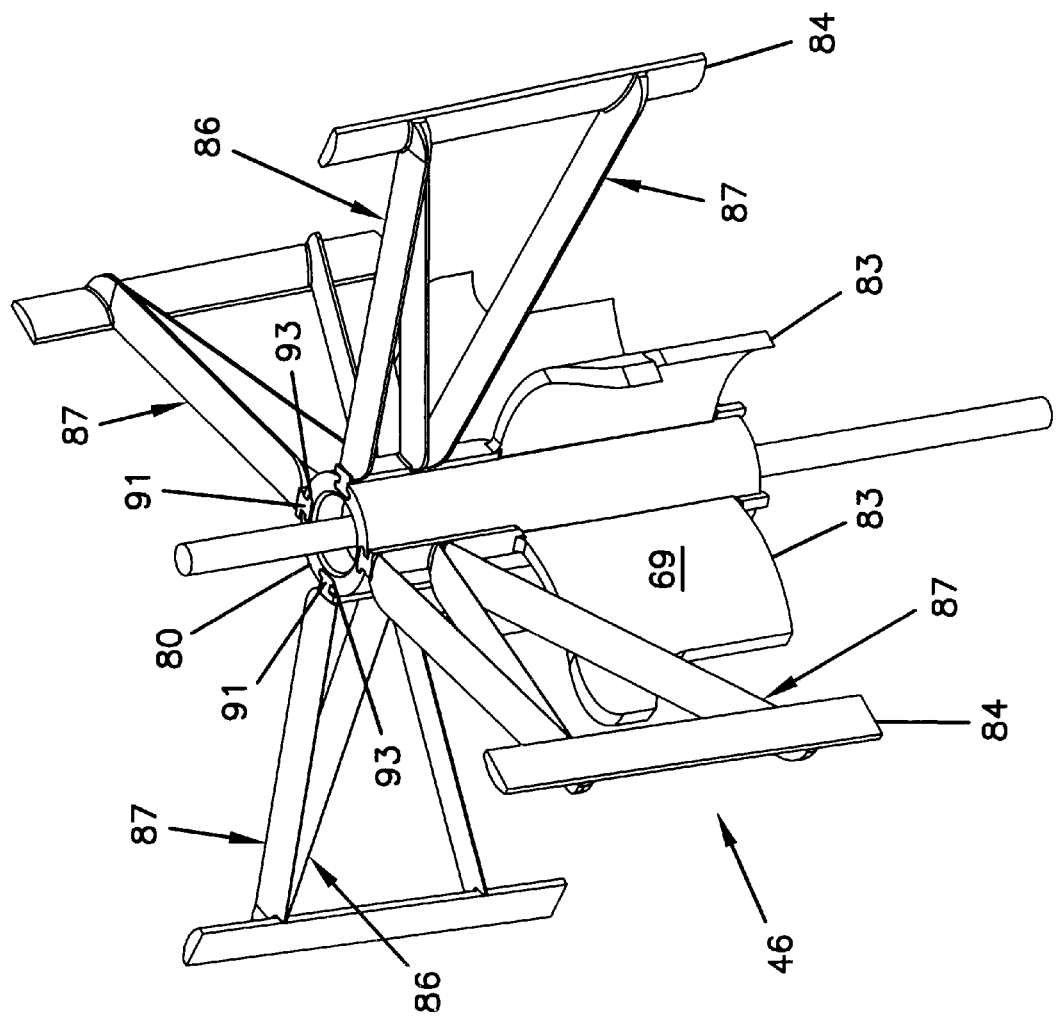
FIG. 7 is a perspective view of a spinner assembly used by the air cleaner of FIG. 2.
Figure 8:
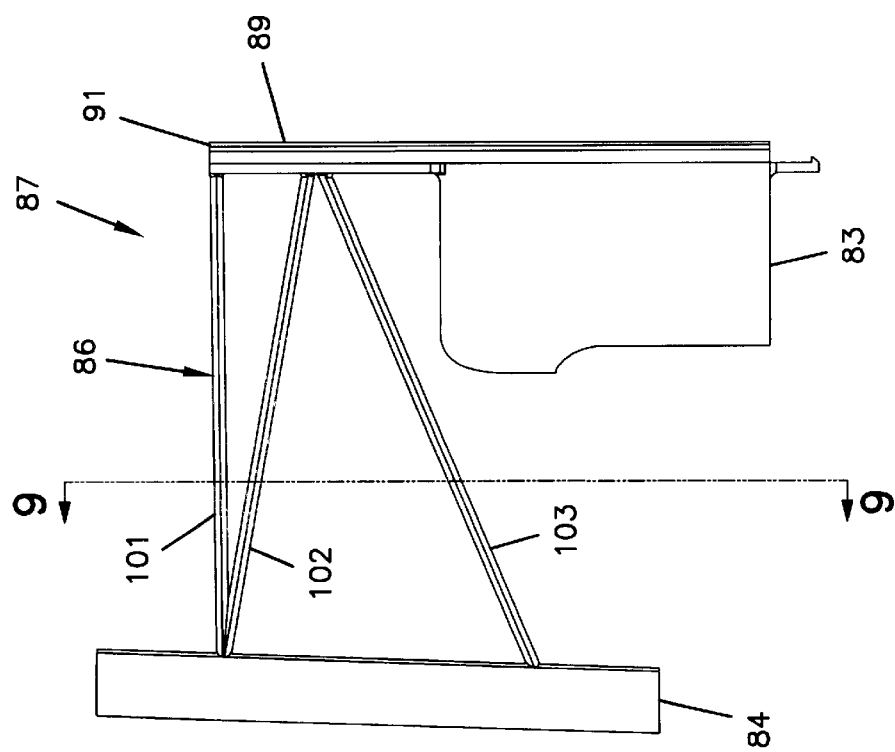
FIG. 8 is an elevational view of one of the blade pieces of the spinner assembly of FIG. 7.

The bearings 82 allow the hub 80 to freely rotate about the central longitudinal axis 38 of the housing 32. As best shown in FIG. 7, a plurality of blade pieces 87 are connected to the hub 80. FIG. 8 shows one of the blade pieces 87 in isolation from the hub 80. The illustrated blade piece 87 includes a fastening end 89 having a fastening structure 91 for fastening the blade piece 87 to the hub 80. As shown in FIG. 7, the fastening structure 91 of each of the blade pieces 87 preferably has a T-shaped cross-sectional profile sized to fit within a corresponding T-shaped slot 93 defined within the hub 80. The blade pieces 87 are preferably connected to the hub 80 by sliding the fastening structures 91 axially into the T-shaped slots 93.

Referring again to FIG. 8, the depicted blade piece 87 includes an inner turbine blade 83 connected directly fastening structure 91. The blade piece 87 also includes an outer blade 84 connected to the fastening structure 91 by a truss structure 86. The truss structure 86 is preferably made up of thin sections having low drag characteristics. If the truss 86 has high drag, pressure loss is increased and secondary flow fields can be established causing particles to follow the wake of the truss structure 86 and enter the outlet tube 58.

Figure 9:
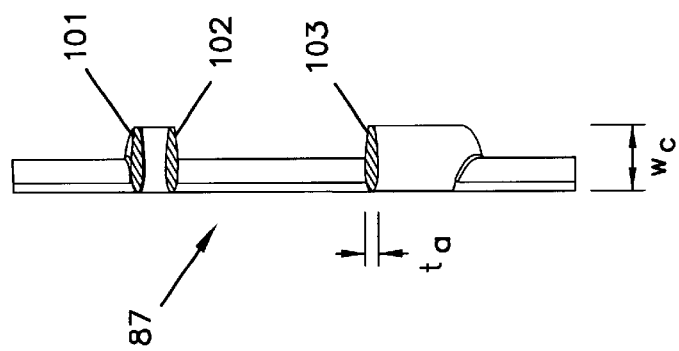
FIG. 9 is a cross-sectional view taken along section-line 9—9 of FIG. 8.

Each truss structure 86 includes first, second and third members 101, 102 and 103 that extend between the outer blade 84 and the fastening structure 91. The members 101–103 are vertically spaced apart with the second members 102 being positioned between the first and third members 101 and 103. Referring to FIG. 8, the first and second members 101 and 102 converge as the first and second members 101 and 102 extend toward the outer blade 84 to form a first triangular support structure. Also, the second and third members 102 and 103 diverge as the members 102 and 103 extend toward the outer blade 84 a second triangular support structure. As best shown in FIG. 9, each of the members 101–103 is shaped in the form of an airfoil for reducing drag. A preferred air foil configuration comprises a NACA 0015 or NACA 0012 airfoil. Alternatively, the members 101–103 could be flat.

Referring to FIG. 9, each of the members 101–103 has an axial thickness $t_a$ and a circumferential width $w_c$. Preferably, each axial thickness $t_a$ is smaller (i.e., shorter) than each circumferential width $w_c$. Each axial thickness $t_a$ is measured in a direction parallel to the longitudinal axis 38 of the housing 32. Each circumferential width w, is preferably measured in a direction that is perpendicular to both: I) to the axial thickness $t_a$; and ii) a radius that projects outward from the longitudinal axis 38. The increased circumferential width $w_c$ provides circumferential stiffness without increasing drag. Each truss structure 86 provides relatively high axial stiffness while maintaining low drag characteristics.

Figure 6:
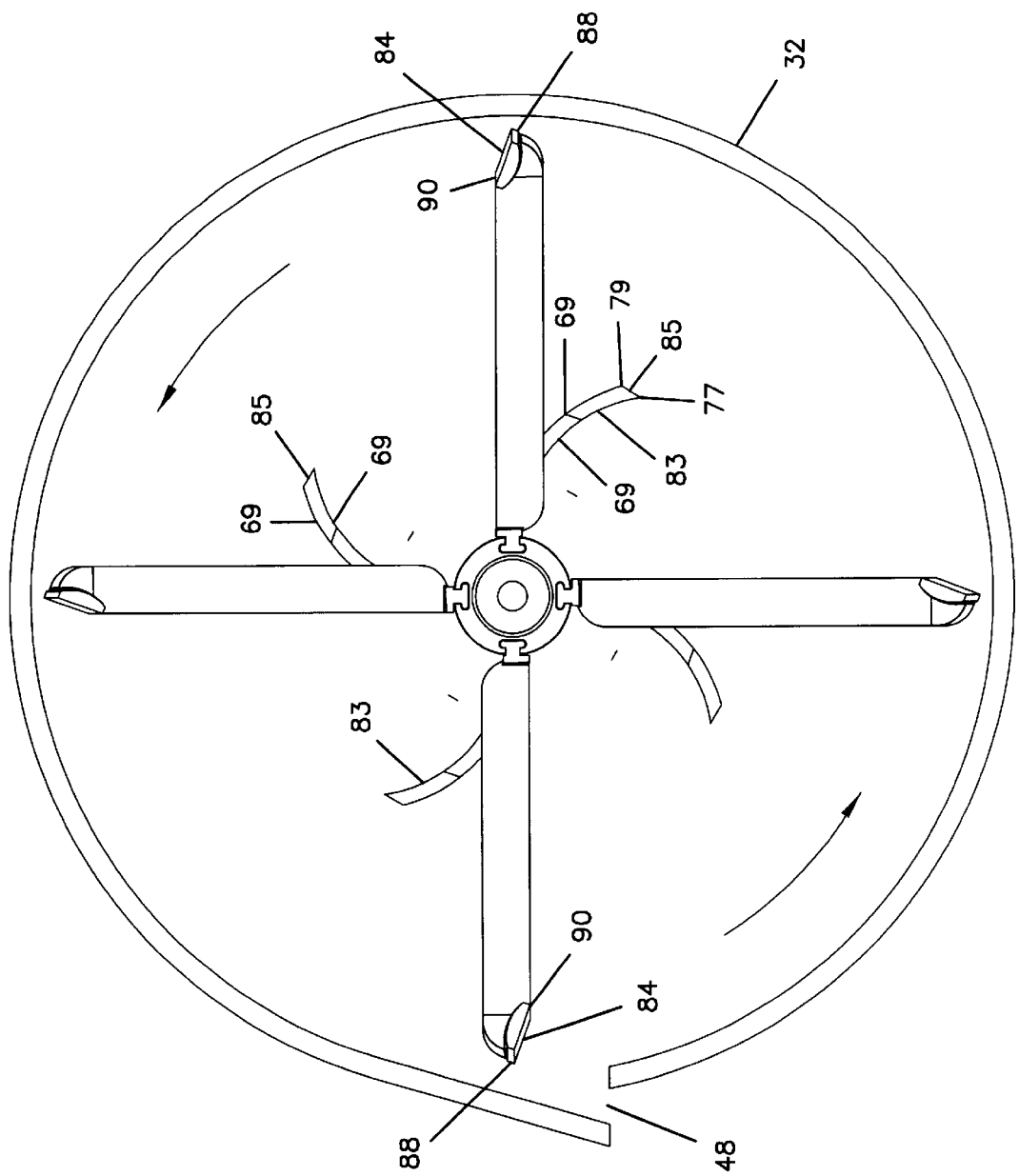
FIG. 6 is a cross-sectional view taken along section line 6—6 of FIG. 3.

As shown in FIG. 6, the outer blades 84 are angled such that an outer radial edge 88 trails an inner radial edge 90 of each blade 84. When the angled outer blades 84 pass by the discharge opening 48, the outer blades 84 generate local regions of higher than atmospheric pressure that force particles out of the discharge opening 48. Preferably, the length of each outer blade 84 is at least slightly larger than the length L of the discharge slot 48. As shown in FIG. 3, lower portions of the outer blades 84 preferably extend below the discharge slot 48 and into the inlet passageway 40 to inhibit "dead zones" from forming in this region. Also, top portions of the outer blades 84 are positioned adjacent to the closed end 50 (i.e., the top) of the housing 32. Moreover, as shown in FIG. 3, each of the outer blades 84 preferably has a width $w_b$ (defined between the inner and outer radial edges 88 and 90) that is at least one quarter the size of the gap g formed at the exit end 72 of the inlet 40.

Referring again to FIG. 6, the turbine blades 83 of the spinner assembly 46 curve as the turbine blades 83 extend radially away from the hub 80 to better capture rotational energy within the separation chamber 34. Of course, the blades could also be straight. Similar to the outer blades 84, an outer end surface 85 of each turbine blade 83 is angled such at an outer edge 77 trails a leading edge 79. As shown in FIG. 6, side surfaces 69 of the turbine blades 83 extend in a vertical direction such that no components of the side surfaces 69 oppose axial flow through the outlet tube 56. However, in alternative embodiments, the side surfaces 69 could be angled relative to vertical (e.g., in a propeller-like fashion) to capture energy corresponding to the axial air flow through the outlet tube 58.

Figure 10:
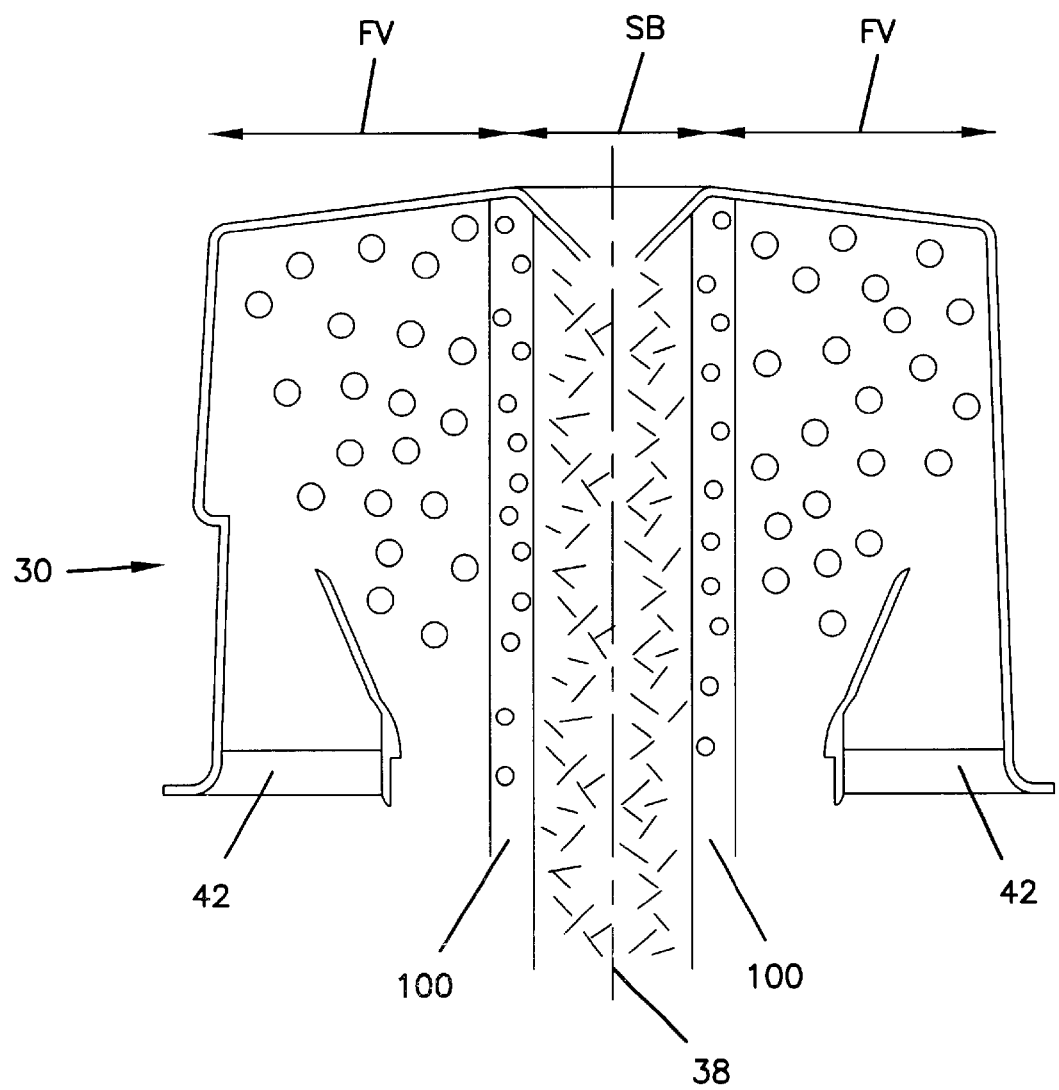
FIG. 10 is a cross-sectional view of the air cleaner of FIG. 2 showing a air flow pattern within the air cleaner with the spinner assembly removed.

FIG. 10 shows the air cleaner 30 with the spinner assembly 46 removed. As shown in FIG. 10, the vanes 42 generate a region of free vortex rotation FV and a region of solid body rotation SB. Transition region 100 within the free vortex rotation zone FV represents a region of peak swirling energy. The radial lengths (i.e., the lengths measured in a radial direction with respect to the axis of rotation 38) of the turbine blades 82 are preferably selected such that the outer tips of the turbine blades 82 extend slightly into the transition region 100. It is also preferred for the lower portions of the turbine blades 82 to be located at least partially within the outlet tube 58. The region 100 is typically about 65% of the smallest outlet diameter of the outlet tube 58. The outside diameter of the solid body rotation zone SB is typically about 40% of the smallest outlet diameter of the outlet tube 58.

Modeling has indicated that pressure drop within the housing can increase faster than efficiency with higher rotation per minute (rpm) spinner assemblies. Therefore, the axial lengths (i.e., the lengths measured in a direction parallel to the axis of rotation 38) of the turbine blades 82 are preferably selected to cause the spinner assembly 46 to rotate at a rate less than 4,000 rpm during normal use (e.g., at an air flow rate of 385 cfm). Further, in certain embodiments, a motor may be added to the spinner assembly to increase efficiency, and reduce pressure drop.

Figure 11:
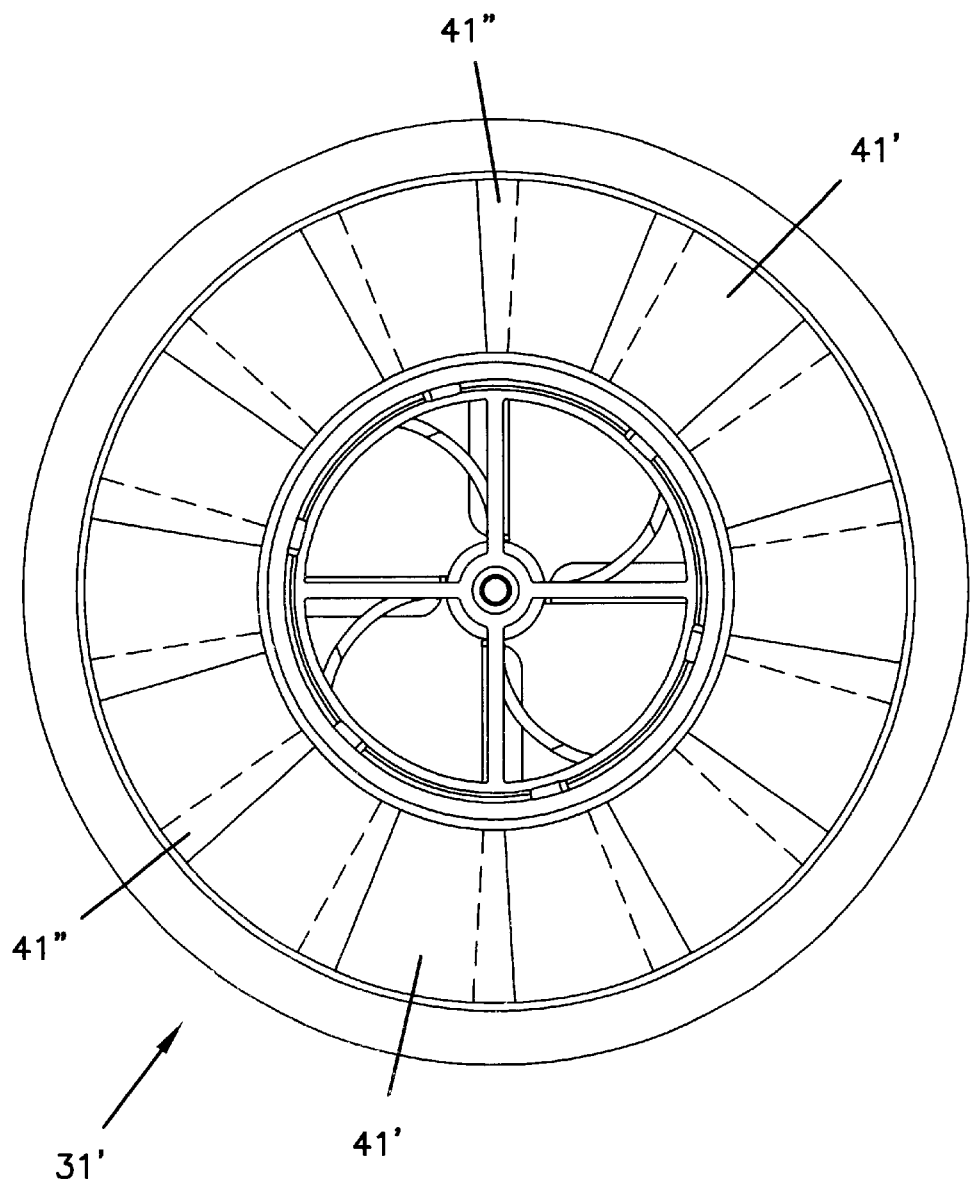
FIG. 11 is a bottom view of an alternative base constructed in accordance with the principles of the present invention.

FIG. 11 shows an alternative base 31' that can be used with the air cleaner 30. The base 31' has fixed swirling vanes 41' that overlap one another at overlap regions 41" when viewed along the longitudinal axis of the cleaner.

Figure 12:
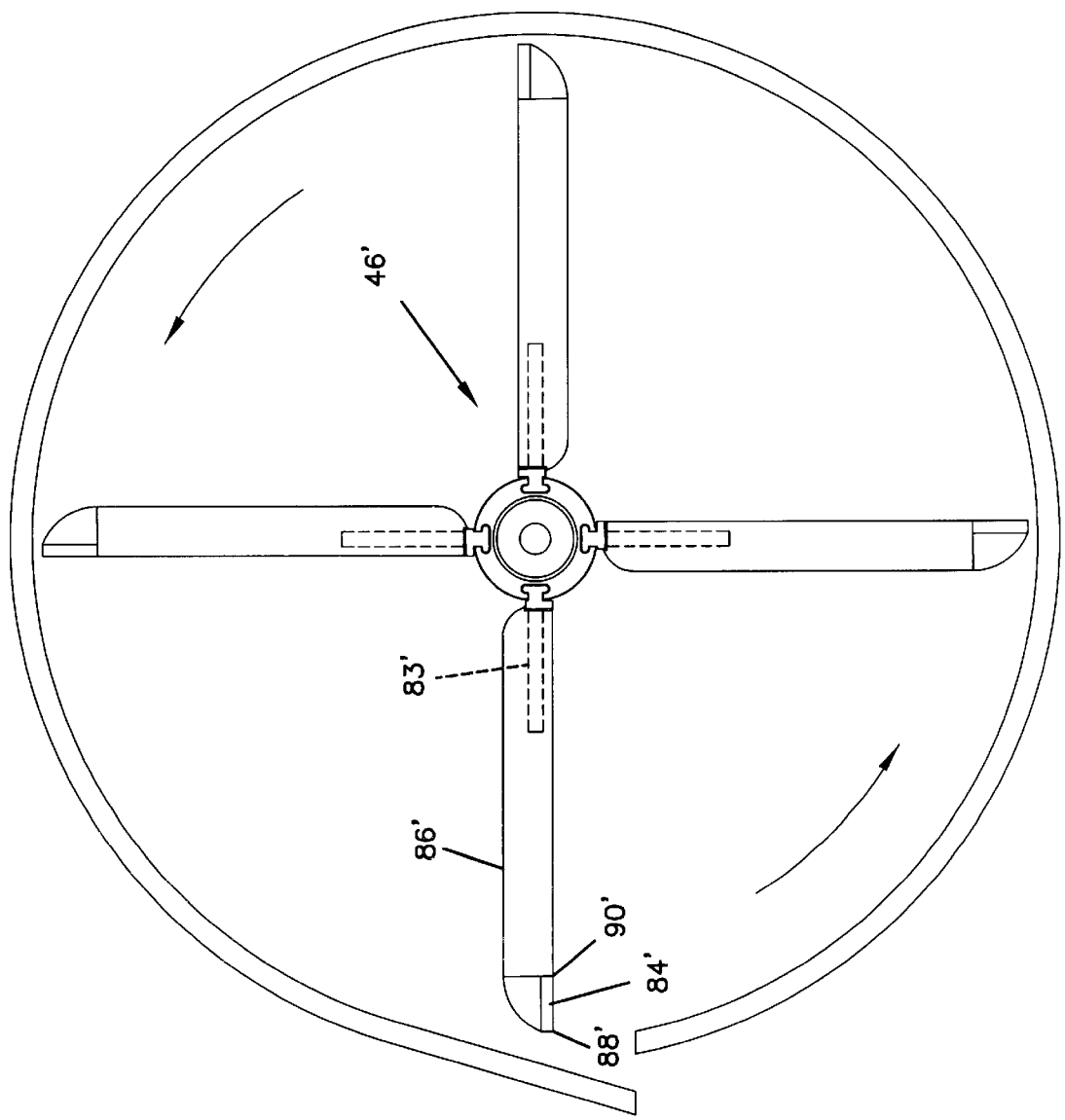
FIG. 12 is a top view of an alternative spinner assembly constructed in accordance with the principles of the present invention.
Figure 13:
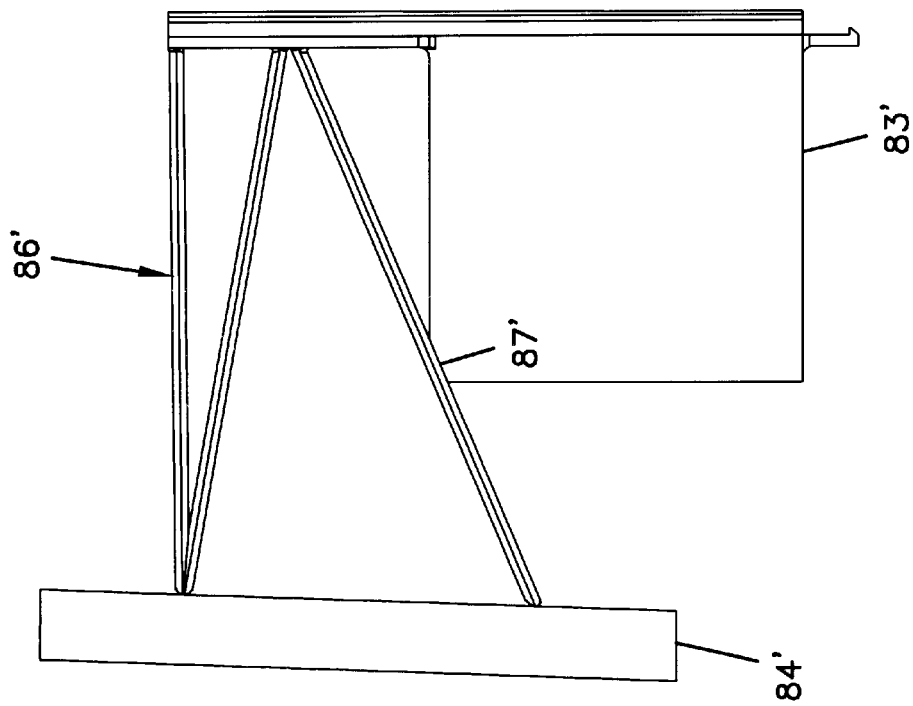
FIG. 13 is an elevational view of one of the blade pieces of the spinner assembly of FIG. 12.

FIGS. 12 and 13 show an alternative spinner assembly 46' constructed in accordance with the principles of the present invention. The spinner assembly 46' includes straight radial turbine blades 83'. The spinner assembly 46' also includes outer blades 84' that are not angled (i.e., outer radial edges 88' do not trail inner radial edges 90'). The outer blades 84' are supported by truss structures 86'. Outer edges 87' of the turbine blades 83' can connect to the truss structures 86' (as shown in FIG. 13) to provide additional rigidity.

With regard to the foregoing description, it is to be understood that changes may be made in detail, especially in the shape, size and arrangement of the parts without departing from the scope of the present invention. It is intended that the specification and depicted aspects considered explanatory only, with a true scope and spirit of the invention being indicated by the broad meaning of the following claims.

What is claimed is:

1. An air cleaner for removing particles from an air stream comprising:

A. a housing defining a separation chamber at which at least some of the particles are removed from the air stream, the separation chamber including:
   a. a closed end positioned opposite from an inlet/outlet end, the closed end being exposed to air swirled within the separation chamber; and
   b. a side wall that extends between the closed end and the inlet/outlet end;

B. an outlet tube defining an outlet passage for allowing the air stream to exit the separation chamber, the outlet tube being positioned adjacent the inlet/outlet end of the housing, the outlet tube including:
   a. an air entrance end positioned opposite from an air exit end, the air entrance end being positioned to receive the air stream from the separation chamber;
   b. a tapered portion positioned adjacent to the air entrance end of the outlet tube, the tapered portion tapering radially outward such that a cross-sectional passage area increases as the outlet tube extends in a direction toward the air entrance end of the outlet tube; and
   c. the cross-sectional passage area of the outlet tube having a value $A_1$ at the air entrance end of the outlet tube;

C. an inlet passage for allowing the air stream to enter the separation chamber, the inlet passage being defined between the side wall of the housing and an outer surface of the outlet tube, the inlet passage including:
   a. an air entrance end positioned opposite from an air exit end, the air exit end of the inlet passage being positioned to direct the air stream into the separation chamber;
   b. a transition region provided by the tapered portion of the outlet tube that reduces a cross-sectional passage area of the inlet passage as the inlet passage extends toward the air exit end of the inlet passage;
   c. the cross-sectional passage area of the inlet passage having a value $A_2$ at the air exit end of the inlet passage, the values $A_1$ and $A_2$ being relatively sized such that $A_1/A_2$ is in the range of 0.7–1.9;

D. a plurality of vanes for causing the air stream to swirl as the air stream flows through the inlet passage and enters the separation chamber;

E. the side wall of the housing defining at least one discharge opening through which the particles are discharged;

F. a spinner assembly positioned within the separation chamber for transferring rotational energy from a mid-region of the separation chamber to an outer region of the separation chamber, the spinner assembly including a central hub and at least one turbine blade attached to the central hub; and G. wherein the separation chamber has a height $H_2$ measured at a location directly above the turbine blade, from the air entrance end of the outlet tube to the closed end of the separation chamber, wherein the separation chamber has a diameter $D_1$ measured at the air entrance end of the outlet tube, and wherein $H_2/D_1$ is in the range of 0.3–0.75.

2. The air cleaner of claim 1, wherein the discharge opening extends longitudinally between the inlet/outlet and closed ends of the separation chamber, wherein the spinner assembly includes inner turbine blades and outer blades, wherein the outer blades have lengths that extend in an upright direction generally between the inlet/outlet and closed ends of the separation chamber, and wherein the outer blades have lower end portions that extend below a lower end of the discharge opening.

3. The air cleaner of claim 2, wherein the lower end portions of the outer blades extend into the inlet passage through the air exit end of the inlet passage.

4. The air cleaner of claim 1, wherein the spinner assembly includes outer blades connected to the central hub by a plurality of connecting members, the outer blades being positioned near the side wall of the housing.

5. The air cleaner of claim 4, wherein the connecting members are sufficiently thin so as to not cause solid body rotation of the air stream within the separation chamber.

6. The air cleaner of claim 5, wherein the inner blades are positioned at least partially within the outlet tube.

7. The air cleaner of claim 5, wherein the inner blades extend only slightly into a free vortex region of the separation chamber.

8. The air cleaner of claim 1, wherein the discharge opening extends longitudinally between the inlet/outlet and closed ends of the separation chamber, and the discharge opening has a smaller width adjacent the closed end of the separation chamber as compared to adjacent the inlet/outlet end of the separation chamber.

9. The air cleaner of claim 8, wherein the width of the discharge opening continuously tapers along a length of the discharge opening.

10. The air cleaner of claim 1, wherein the tapered portion of the outlet tube has a truncated conical shape.

11. The air cleaner of claim 10, wherein the tapered portion of the outlet tube has a cone angle θ in the range of 15–45 degrees relative to a central axis of the outlet tube.

12. The air cleaner of claim 11, wherein the cone angle θ is in the range of 20–30 degrees.

13. The air cleaner of claim 1, wherein $A_1/A_2$ is in the range of 1.2 to 1.4.

14. The air cleaner of claim 1, wherein the housing has a height $H_1$ measured from a downstream region of the vanes to the closed end of the separation chamber, wherein the separation chamber has a diameter $D_1$ at the exit end of the inlet passage, and wherein $H_1/D_1$ is in the range of 0.5–1.0.

15. The air cleaner of claim 14, wherein $H_1/D_1$ is in the range of 0.5–0.7.

16. An air cleaner for removing particles from an air stream comprising:
   A. a housing defining a separation chamber at which at least some of the particles are removed from the air stream, the separation chamber including:
      a. a closed end positioned opposite from an inlet/outlet end, the closed end being exposed to air swirled within the separation chamber; and
      b. a side wall that extends between the closed end and the inlet/outlet end;
   B. an outlet passage positioned adjacent the inlet/outlet end of the separation chamber for allowing the air stream to exit the separation chamber, the outlet passage including an air entrance end positioned opposite from an air exit end, the air entrance end being positioned to receive the air stream from the separation chamber, and the outlet passage having a cross-sectional passage area $A_1$ at the air entrance end of the outlet passage;
   C. an inlet passage at least partially surrounding the outlet passage for allowing the air stream to enter the separation chamber, the inlet passage including an air entrance end positioned opposite from an air exit end, the air exit end of the inlet passage having a cross-sectional passage area $A_2$, the areas $A_1$ and $A_2$ being relatively sized such that $A_1/A_2$ is in the range of 0.7–1.9;
   D. a plurality of vanes for causing the air stream to swirl as the air stream flows through the inlet passage and enters the separation chamber;
   E. the housing including a side wall defining at least one discharge opening through which the particles are discharged;
   F. a spinner assembly positioned within the separation chamber for transferring rotational energy from a mid-region of the separation chamber to an outer region of the separation chamber; and
   G. wherein the separation chamber has a height $H_2$ measured from the air entrance end of the outlet passage to the closed end of the separation chamber, wherein the separation chamber has a diameter $D_1$ measured at the air entrance end of the outlet passage, and wherein $H_2/D_1$ is in the range of 0.3–0.75.

17. The air cleaner of claim 16, wherein the inlet passage and the outlet passage are concentric.

18. The air cleaner of claim 16, wherein the outlet passage tapers radially outward adjacent to the air entrance end of the outlet passage.

19. An air cleaner for removing particles from an air stream comprising:
   A. a housing defining a separation chamber at which at least some of the particles are removed from the air stream;
   B. an outlet tube defining an outlet passage for allowing the air stream to exit the separation chamber, the outlet tube including:
      a. an air entrance end positioned opposite from an air exit end, the air entrance end being positioned to receive the air stream from the separation chamber; and
      b. a tapered portion positioned adjacent to the air entrance end of the outlet tube, the tapered portion tapering radially outward such that a cross-sectional passage area increases as the outlet tube extends in a direction toward the air entrance end of the outlet tube, the tapered portion being aligned along an angle θ in the range of 20–30 degrees relative to a central axis of the outlet tube;
   C. an inlet passage for allowing the air stream to enter the separation chamber, the inlet passage being at least partially defined by an outer surface of the outlet tube, the inlet passage including:
      a. an air entrance end positioned opposite from an air exit end, the air exit end of the inlet passage being positioned to direct the air stream into the separation chamber;
      b. a transition region provided by the tapered portion of the outlet tube that reduces a cross-sectional passage area of the inlet passage as the inlet passage extends toward the air exit end of the inlet passage;
   D. a plurality of vanes for causing the air stream to swirl as the air stream flows through the inlet passage and enters the separation chamber;
   E. the housing including a side wall defining at least one discharge opening through which the particles are discharged; and F. a spinner assembly positioned within the separation chamber for transferring rotational energy from a mid-region of the separation chamber to an outer region of the separation chamber.

20. The air cleaner of claim 19, wherein the tapered portion of the outlet tube has a truncated conical shape.

21. The air cleaner of claim 19, wherein the tapered portion extends from adjacent the vanes to the air entrance end of the outlet tube.

22. An air cleaner for removing particles from an air stream comprising:
   A. a housing defining a separation chamber at which at least some of the particles are removed from the air stream, the housing including a side wall structure surrounding a central axis of the housing;
   B. an outlet passage for allowing the air stream to exit the separation chamber;
   C. an annular inlet passage for allowing the air stream to enter the separation chamber, the inlet passage being positioned to at least partially surround the outlet passage, the inlet passage including an air entrance end positioned opposite from an air exit end, the air exit end of the inlet passage being positioned to direct the air stream into the separation chamber, the inlet passage being defined between inner and outer walls, the inner wall including a transition region that reduces a cross-sectional passage area of the inlet passage as the inlet passage extends toward the air exit end of the inlet passage;
   D. a plurality of vanes for causing the air stream to swirl as the air stream flows through the inlet passage and enters the separation chamber;
   E. the transition region of the inner wall being located at the air exit end of the inlet passage and being configured such that no portion of the transition region is aligned at an angle outside the range of 20–30 degrees relative to the central axis of the housing;
   F. the side wall structure of the housing defining at least one discharge opening through which the particles are discharged; and
   G. a spinner assembly positioned within the separation chamber for transferring rotational energy from a mid-region of the separation chamber to an outer region of the separation chamber.

23. The air cleaner of claim 22, wherein the transition region of the inner wall has a truncated cone shape with a minor diameter at the exit end of the inlet passage.

24. The air cleaner of claim 22, wherein the inner wall is provided by an outlet tube that defines the outlet passage of the housing, the outlet tube having a tapered portion that corresponds to the transition region.

25. The air cleaner of claim 24, wherein the outlet passage includes an air entrance end and an air exit end, and wherein the tapered portion increases a passage area of the outlet passage as the outlet passage extends toward the air entrance end.

26. The air cleaner of claim 22, wherein the transition region has a length l that is greater than a gap defined between the inner and outer walls of the inlet passage at the air exit end of the inlet passage.

27. An air cleaner for removing particles from an air stream comprising:
   A. a housing defining a separation chamber at which at least some of the particles are removed from the air stream, the separation chamber including:
      a. a closed end positioned opposite from an inlet/outlet end, the closed end being exposed to air swirled within the separation chamber; and
      b. a side wall that extends between the inlet/outlet and closed ends;
   B. an outlet tube defining an outlet passage for allowing the air stream to exit the separation chamber, the outlet tube being positioned adjacent the inlet/outlet end of the housing, the outlet tube including an air entrance end positioned opposite from an air exit end, the air entrance end being positioned to receive the air stream from the separation chamber;
   C. an inlet passage for allowing the air stream to enter the separation chamber, the inlet passage being defined between the side wall of the housing and an outer surface of the outlet tube, the inlet passage including an air entrance end positioned opposite from an air exit end, the air exit end of the inlet passage being positioned to direct the air stream into the separation chamber;
   D. a plurality of vanes for causing the air stream to swirl as the air stream flows through the inlet passage and enters the separation chamber;
   E. a spinner assembly positioned within the separation chamber; and
   F. the separation chamber having a height $H_2$ measured from the air entrance end of the outlet tube to the closed end of the separation chamber, the separation chamber having a diameter $D_1$ measured at the air entrance end of the outlet tube, and $H_2/D_1$ being in the range of 0.3–0.75.

28. An air cleaner for removing particles from an air stream comprising:
   A. a housing defining a separation chamber at which at least some of the particles are removed from the air stream, the housing including a first end positioned opposite from a second end, the housing also including a side wall structure that surrounds a longitudinal axis of the housing and extends between the first and second ends;
   B. an outlet passage for allowing the air stream to exit the separation chamber, the outlet passage being positioned adjacent one of the first and second ends of the housing;
   C. an inlet passage for allowing the air stream to enter the separation chamber, the inlet passage being positioned adjacent the first end of the housing;
   D. a plurality of vanes for causing the air stream to swirl within the separation chamber;
   E. a discharge opening defined by the side wall structure of the housing for allowing at least some of the particles to be discharged from the housing; and
   F. a spinner assembly positioned within the separation chamber, the spinner assembly including;
      a) a central hub;
      b) a plurality of turbine blades that project radially outward from the hub;
      c) an outer blade positioned adjacent to the side wall of the housing;
      d) first and second connecting members connecting the outer blade to the hub, the connecting members each having a circumferential width that is greater than an axial width.

29. The air cleaner of claim 28, further comprising a third connecting member connecting the outer blade to the hub, the third connecting member cooperating with the first and second connecting members to form a truss structure having first and second triangular support structures.

30. The air cleaner of claim 28, wherein the first and second connecting members comprise air foils.

31. The air cleaner of claim 28, wherein the outlet passage is located at the first end of the housing and wherein the outer blade is longer than the discharge opening.

32. The air cleaner of claim 31, wherein a portion of the outer blade extends into the inlet passage.

33. The air cleaner of claim 32, wherein the inlet passage defines a gap at the air exit end of the inlet passage, an wherein the outer blade has a width that extends at least one quarter a width of the gap.

34. The air cleaner of claim 28, wherein the vanes generate regions of free vortex rotation and solid body rotation within the separation chamber, and wherein the turbine blades are sized such that outer tips of the blades terminate at a transition region between the regions of solid body and free vortex rotation.

35. The air cleaner of claim 28, wherein the turbine blades are sized such that the spinner assembly does not exceed 4000 rotations-per minute during normal use.

36. The air cleaner of claim 28, wherein the turbine blades are at least partially within the outlet tube.

37. The air cleaner of claim 28, wherein the turbine blades are formed separately from the central hub.

38. The air cleaner of claim 37, wherein the turbine blades are connected to the hub by a tongue and groove connection.

* * * * *